(12) United States Patent
Chen et al.

(10) Patent No.: US 8,362,663 B2
(45) Date of Patent: Jan. 29, 2013

(54) TERMINAL BOX FOR CENTRIFUGAL SWITCH OF MOTOR AND MOTOR WITH THE SAME

(75) Inventors: Fucheng Chen, Zhongshan (CN); Ping Lu, Zhongshan (CN); Shuangchao Deng, Zhongshan (CN); Xiao Liu, Zhongshan (CN)

(73) Assignee: Zhongshan Broad-Ocean Motor Manufacturing Co., Ltd., Zhongshan (CN)

( * ) Notice: Subject to any disclaimer, the term of this patent is extended or adjusted under 35 U.S.C. 154(b) by 198 days.

(21) Appl. No.: 12/876,146

(22) Filed: Sep. 5, 2010

(65) Prior Publication Data

US 2011/0234030 A1    Sep. 29, 2011

(30) Foreign Application Priority Data

Mar. 25, 2010   (CN) .................... 2010 2 0148430 U

(51) Int. Cl.
*H02K 11/00* (2006.01)
*H05K 5/02* (2006.01)
(52) U.S. Cl. .................. 310/68 C; 310/68 E; 310/71
(58) Field of Classification Search ............. 310/68 C, 310/68 E, 71
See application file for complete search history.

(56) References Cited

U.S. PATENT DOCUMENTS

| | | | | |
|---|---|---|---|---|
| 3,351,790 | A | * | 11/1967 | Linkous ................ 310/68 R |
| 4,186,318 | A | * | 1/1980 | Anderson ............... 310/68 C |
| 4,198,583 | A | * | 4/1980 | Anderson et al. ........... 310/71 |
| 5,640,064 | A | * | 6/1997 | Boyd et al. .............. 310/211 |
| 2010/0031529 | A1 | * | 2/2010 | Johnson et al. ........... 34/525 |

* cited by examiner

*Primary Examiner* — Burton Mullins
(74) *Attorney, Agent, or Firm* — Matthias Scholl P.C.; Matthias Scholl

(57) ABSTRACT

A terminal box, including at least a box (51) having a receiving part (10), a movable control rod (7), multiple electric contacts (8), a thermostat (9) having a terminal (91), and a wiring mechanism (12). The movable control rod (7) is disposed on the box (51) and partially extends therefrom. The electric contacts (8) are disposed in the box (51). The thermostat (9) is disposed on end surface of the box (51). The receiving part (10) operates to receive the thermostat (9). One end of the electric contact (8) extends from the box (51) and forms a connecting part (81). A separating plate (11) is disposed between the connecting part (81) and the thermostat (9). One end of the wiring mechanism (12) is connected to the connecting part (81), and the other end thereof bypasses the outside of the separating plate (11) and is connected to the terminal (91). If the thermostat experiences temperature detection failure, users of the motor can easily remove the wiring mechanism, and timely switch off the power supply connected to the motor via an external protection circuit thereby preventing the motor from being burned out.

8 Claims, 8 Drawing Sheets

TERMINAL BOX FOR CENTRIFUGAL SWITCH OF MOTOR AND MOTOR WITH THE SAME

CROSS-REFERENCE TO RELATED APPLICATIONS

Pursuant to 35 U.S.C. §119 and the Paris Convention Treaty, this application claims the benefit of Chinese Patent Application No. 201020148430.5 filed on Mar. 25, 2010, the contents of which are incorporated herein by reference.

BACKGROUND OF THE INVENTION

1. Field of the Invention

The invention relates to a terminal box for a centrifugal switch of a motor and a motor using the same.

2. Description of the Related Art

Nowadays, most terminal boxes for centrifugals switches of single-phase induction motors each comprise a box, a movable control rod extending from the box, and a thermostat disposed on end surface of the box. A function of the thermostat is to switch off a power supply connected to the motor as temperature is too high. As shown in FIG. 1, a box 1 comprises a receiving part 3 operating to receive the thermostat 2, and multiple connecting terminals 4. An electric connection sheet 5 is extended from the top of the connecting terminal 4, a separating plate 6 is disposed between the connecting terminal 4 and the thermostat 2, a groove 7 is disposed on the separating plate 6, the electric connection sheet 5 passes through the groove 7 and is spot-welded with a terminal 8 of the thermostat. This structure has the following problems: since the electric connection sheet is spot-welded with the terminal of the thermostat, as the thermostat has temperature detection failure, it is impossible to timely switch off the power supply connected to the motor, and the motor will be burned out, which brings great trouble for users of the motor. Moreover, it is difficult and inconvenient for the users to remove the electric connection sheet.

SUMMARY OF THE INVENTION

In view of the above-described problem, it is one objective of the invention to provide a terminal box for a centrifugal switch of a motor that is capable of addressing the above-mentioned problems, and features simple structure of a wiring mechanism, and convenient assembling and disassembling, and brings great convenience for users of the motor.

To achieve the above objectives, in accordance with one embodiment of the invention, provided is a terminal box for a centrifugal switch of a motor, comprising a box comprising a receiving part, a movable control rod, multiple electric contacts, a thermostat having a terminal, a wiring mechanism. The movable control rod is disposed on the box and partially extends therefrom, the electric contacts are disposed in the box, the thermostat is disposed on end surface of the box, the receiving part operates to receive the thermostat, one end of the electric contact extends from the box and forms a connecting part, a separating plate is disposed between the connecting part and the thermostat, one end of the wiring mechanism is connected to the connecting part, and the other end thereof bypasses the outside of the separating plate and is connected to the terminal.

In a class of this embodiment, the wiring mechanism comprises a first connecting terminal, a second connecting terminal, and an electrical lead.

In a class of this embodiment, the first connecting terminal is connected to the connecting part, the second connecting terminal is connected to the terminal, one end of the electrical lead is connected to the first connecting terminal, and the other end thereof bypasses the outside of the separating plate and connected to the second connecting terminal.

In a class of this embodiment, each of the first connecting terminal and the second connecting terminal comprises a pressing part, and an inserting part connected to the pressing part, the pressing part presses and punctuates surface of the electrical lead, and the inserting part is directly connected to the terminal and the connecting part.

Advantage of the invention comprises: the wiring mechanism features simple structure, and convenient disassembling and assembling, which brings great convenience for users of the motor; even the thermostat has temperature detection failure, the users can easily remove the wiring mechanism, and timely switch off the power supply connected to the motor via an external protection circuit, whereby preventing the motor from being burned out.

It is another objective of the invention to provide a motor that is capable of addressing the above-mentioned problems and comprising a wiring mechanism in a terminal box thereof, and features simple structure of a wiring mechanism, and convenient assembling and disassembling, brings great convenience for users of the motor, and prevents the motor from being burned out.

In accordance with another embodiment of the invention, provided is a motor, comprising a stator, a rotor, a front end cover, a rear end cover, and a terminal box, comprising a box comprising a receiving part, a movable control rod, multiple electric contacts, a thermostat having a terminal, and a wiring mechanism. The front end cover is connected to the rear end cover whereby forming a cavity, the rotor and the stator are disposed in the cavity, the terminal box is disposed on outer wall of one of the front end cover and the rear end cover, the movable control rod is disposed on the box and partially extends therefrom, the electric contacts are disposed in the box, the thermostat is disposed on end surface of the box, the receiving part operates to receive the thermostat, one end of the electric contact extends from the box and forms a connecting part, a separating plate is disposed between the connecting part and the thermostat, one end of the wiring mechanism is connected to the connecting part, and the other end thereof bypasses the outside of the separating plate and is connected to the terminal.

In a class of this embodiment, a fixing part is disposed on outer wall of the end cover and in the vicinity of the terminal box, the fixing part comprises a fixing clamp, the fixing clamp fixes an enameled wire led out from the motor, and a tail of the enameled wire is disposed in the terminal box.

In a class of this embodiment, the wiring mechanism comprises a first connecting terminal, a second connecting terminal, and an electrical lead.

In a class of this embodiment, the first connecting terminal is connected to the connecting part, the second connecting terminal is connected to the terminal, one end of the electrical lead is connected to the first connecting terminal, and the other end thereof bypasses the outside of the separating plate and connected to the second connecting terminal.

In a class of this embodiment, each of the first connecting terminal and the second connecting terminal comprises a pressing part, and an inserting part connected to the pressing part, the pressing part presses and punctuates surface of the electrical lead, and the inserting part is directly connected to the terminal and the connecting part.

In a class of this embodiment, each of the first connecting terminal and the second connecting terminal is integrally formed via aluminum.

Advantages of the invention comprise: 1) the wiring mechanism features simple structure, and convenient disassembling and assembling, which brings great convenience for users of the motor; even the thermostat has temperature detection failure, the users can easily remove the wiring mechanism, and timely switch off the power supply connected to the motor via an external protection circuit, whereby preventing the motor from being burned out; 2) the fixing part is disposed on the motor, the fixing clamp on the fixing part effectively protects and fixes the enameled wire led out from the motor, and ensures stability and reliability of electric connection.

DETAILED DESCRIPTION OF THE EMBODIMENTS

Further description of the invention will be given below in conjunction with specific embodiments and accompanying drawings.

Example 1

Figure 1:
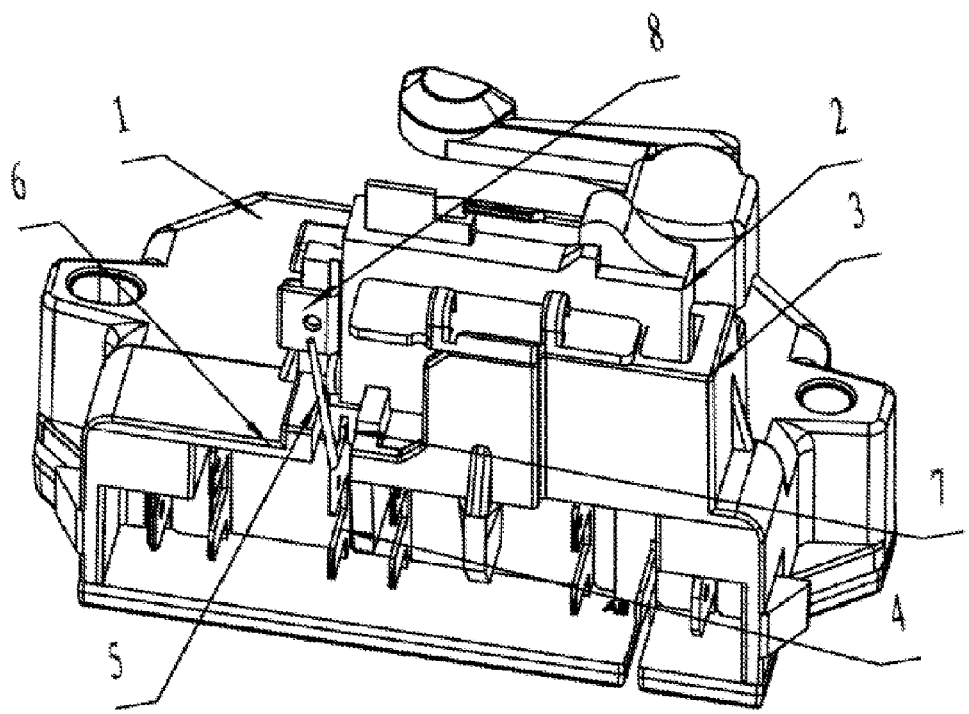
FIG. 1 is a solid diagram of a terminal box for a centrifugal switch of a motor in the related art.
Figure 2:
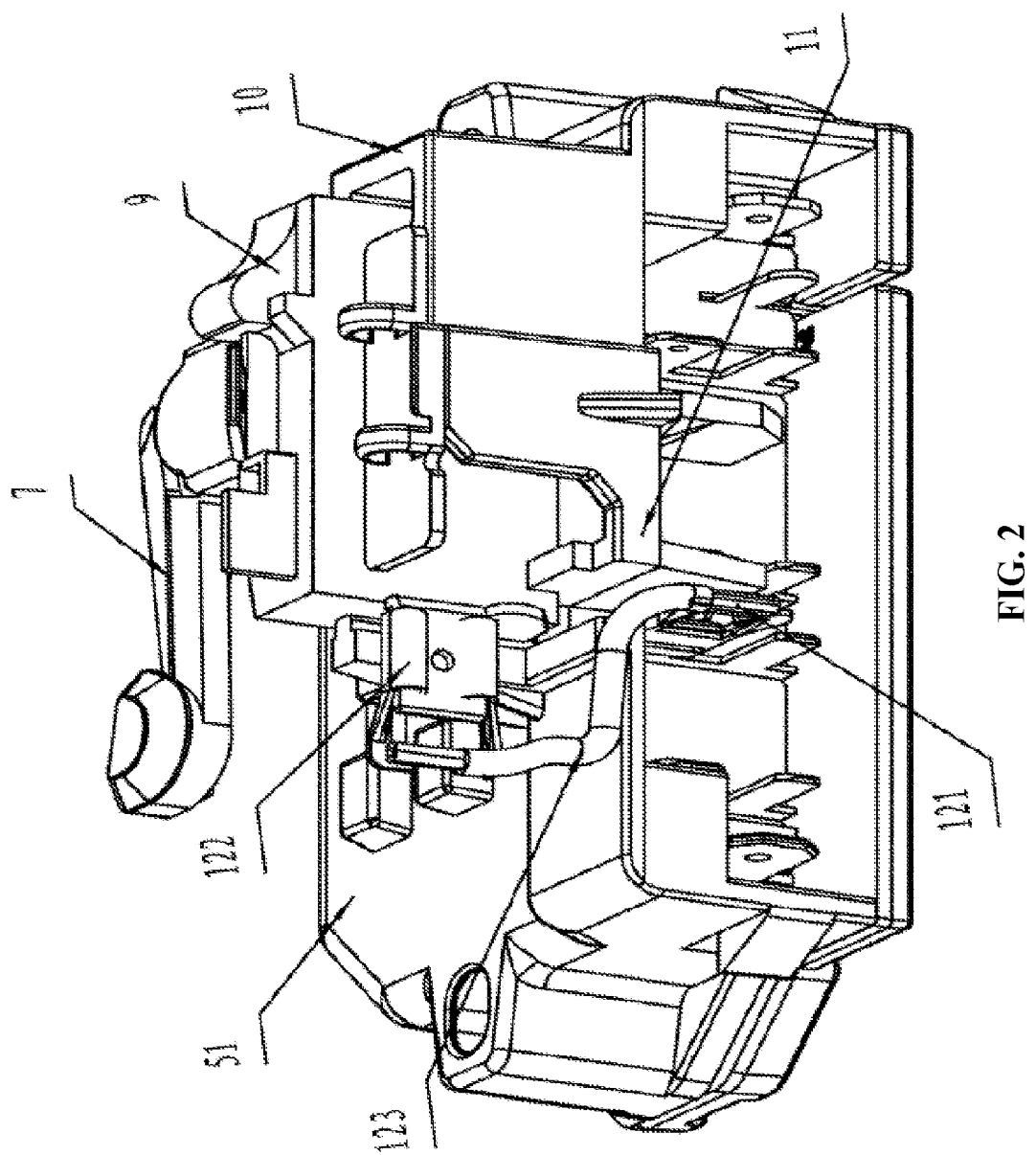
FIG. 2 is a solid diagram of a terminal box for a centrifugal switch of a motor of an exemplary embodiment of the invention.
Figure 3:
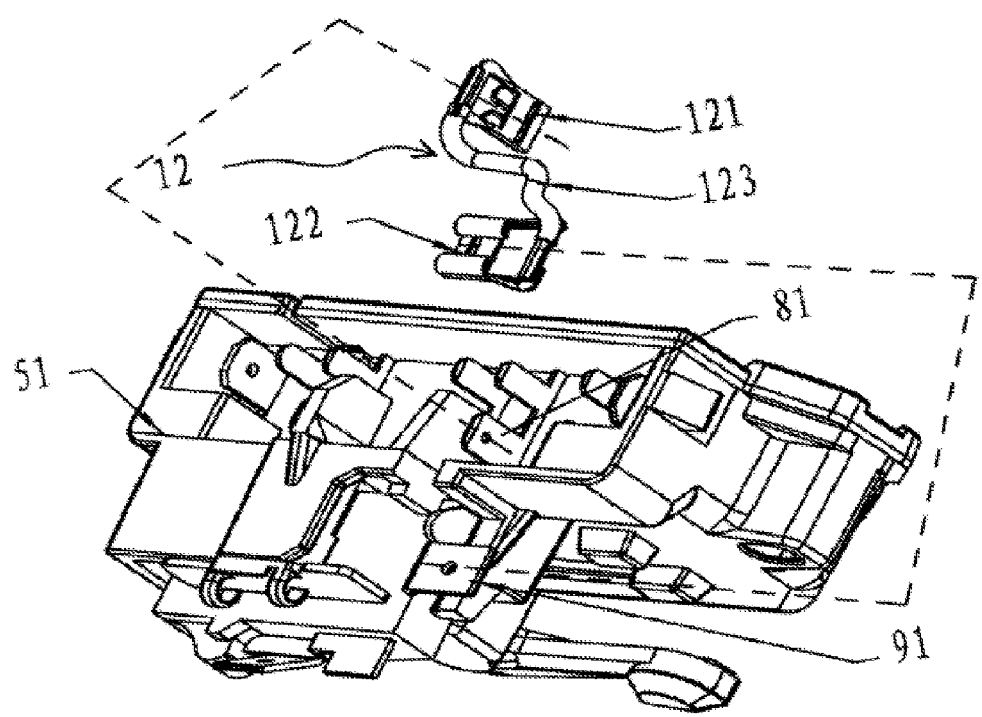
FIG. 3 is a partially exploded view of FIG. 2.
Figure 4:
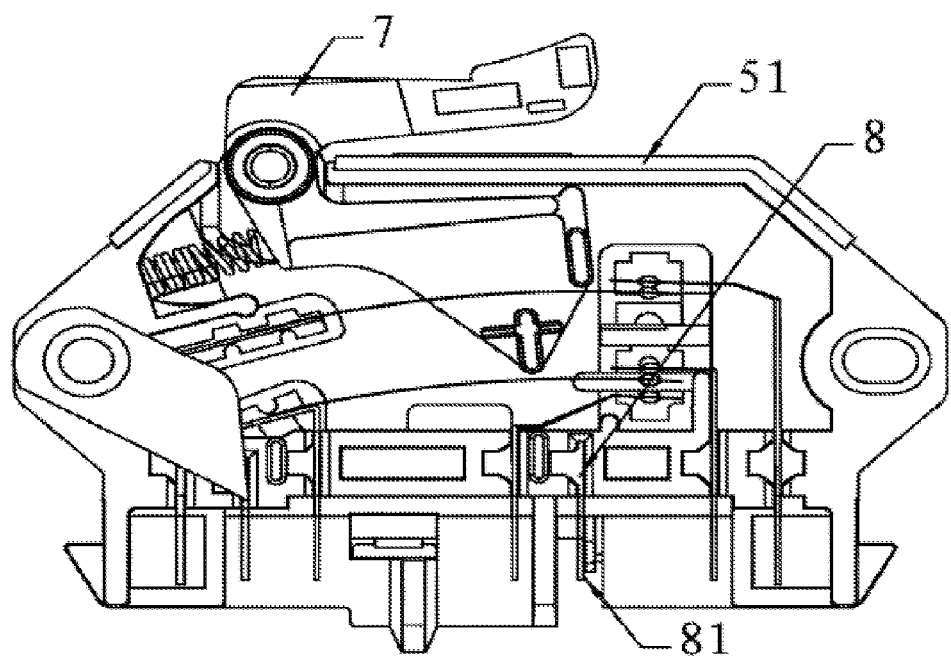
FIG. 4 is an internal structural view of a terminal box in FIG. 2 without a bottom cover.

As shown in FIGS. 2, 3 and 4, a terminal box for a centrifugal switch of a motor comprises a box 51, a movable control rod 7 disposed on the box 51 and partially extending from the box, multiple electric contacts 8 disposed in the box 51, and a thermostat 9 disposed on end surface of the box. The box 51 comprises a receiving part 10 operating to receive the thermostat 9, one end of the electric contact 8 extending from the box and forming a connecting part 81, a separating plate 11 being disposed between the connecting part 81 and the thermostat 9. The terminal box further comprises a wiring mechanism 12, one end of the wiring mechanism 12 is connected to the connecting part 81, and the other end thereof bypasses the outside of the separating plate 11 and is connected to a terminal 91 of the thermostat 9.

Figure 5:
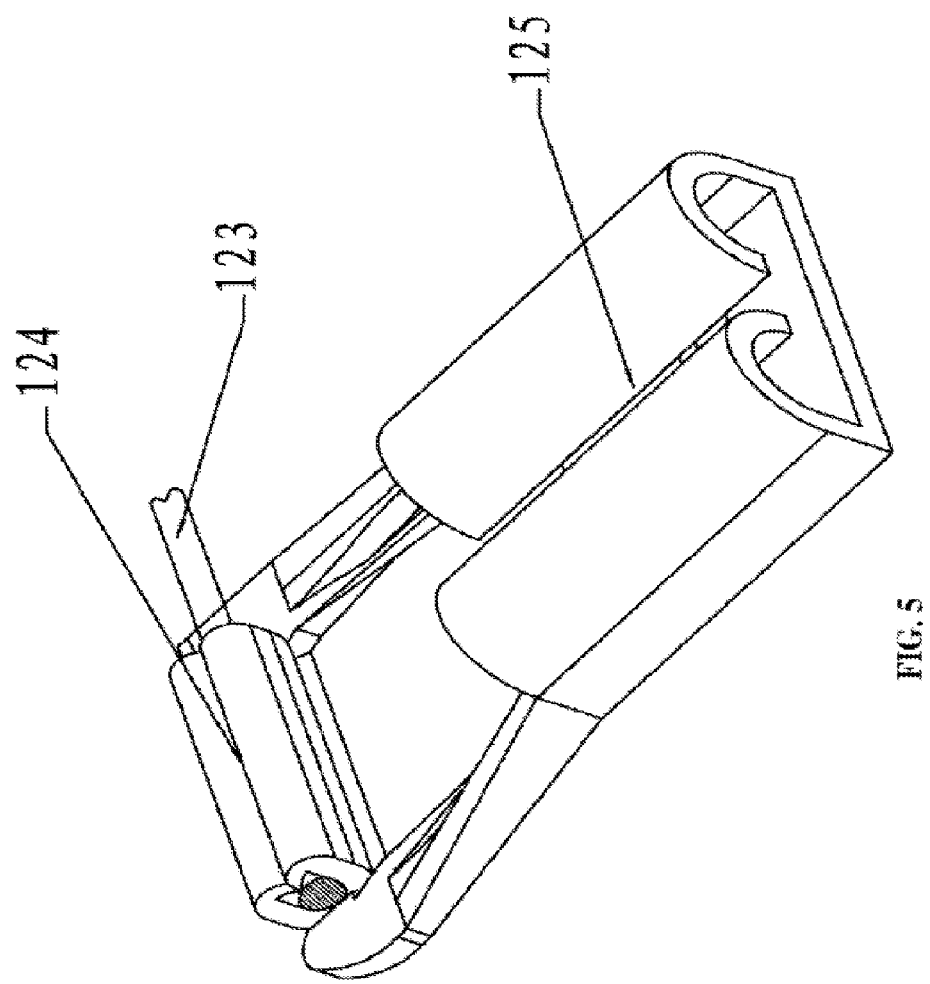
FIG. 5 illustrates connection between an electrical lead and a connecting terminal in FIG. 3.
Figure 6:
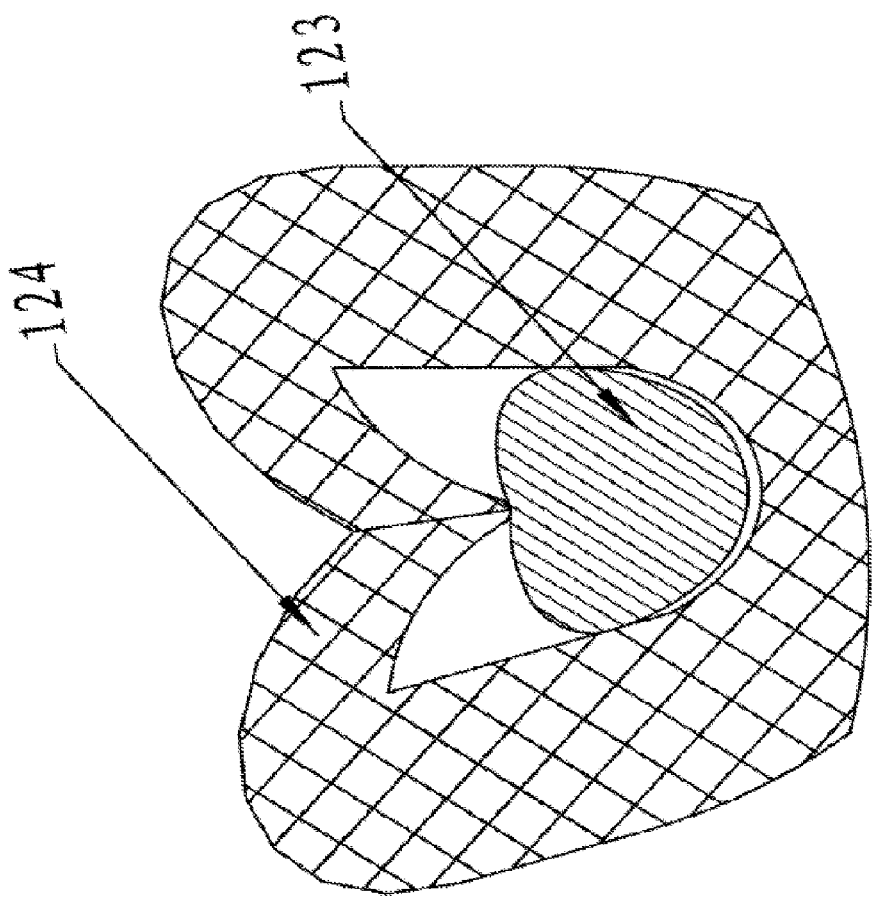
FIG. 6 is a cross-sectional view of connection between the electrical lead and the connecting terminal in FIG. 5.

The wiring mechanism 12 comprises a first connecting terminal 121 connected to the connecting part 81, a second connecting terminal 122 connected to the terminal 91, and an electrical lead 123. One end of the electrical lead 123 is connected to the first connecting terminal 121, and the other end thereof bypasses the outside of the separating plate 11 and connected to the second connecting terminal 122. As shown in FIGS. 5 and 6, the connecting terminals each comprises a pressing part 124, and an inserting part 125 connected to the pressing part 124. The pressing part 124 presses and punctuates surface of the electrical lead 123, and the inserting part 125 is directly connected to the terminal 91 and the connecting part 81, whereby forming electric connection between the thermostat and the connecting part 81 of the electric contact 8.

Example 2

Figure 7:
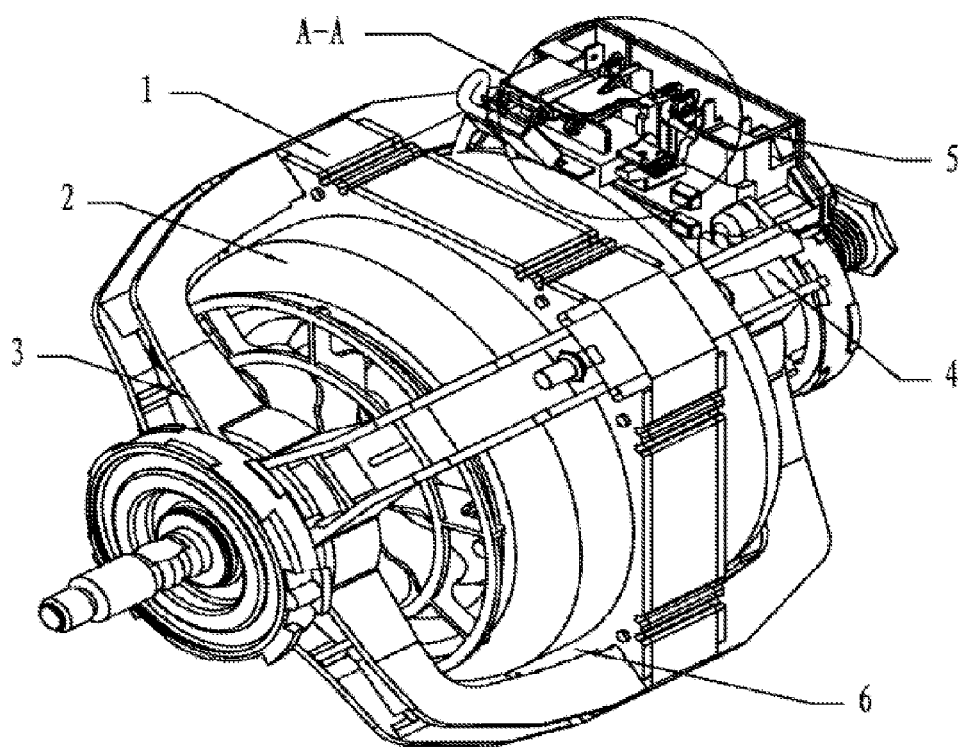
FIG. 7 is a solid diagram of a motor of another exemplary embodiment of the invention.

As shown in FIG. 7, a motor of the invention comprises a stator 1, a rotor 2, a front end cover 3, a rear end cover 4, and a terminal box 5. The front end cover 3 is connected to the rear end cover 4 whereby forming a cavity 6, the rotor 2 and the stator 1 is disposed in the cavity 6, the terminal box 5 is disposed on outer wall of one of the end covers. As shown in FIGS. 2, 3 and 4, the terminal box 5 comprises a box 51, a movable control rod 7 disposed on the box 51 and partially extending from the box, multiple electric contacts 8 disposed in the box 51, and a thermostat 9 disposed on end surface of the box. The box 51 comprises a receiving part 10 operating to receive the thermostat 9, one end of the electric contact 8 extending from the box and forming a connecting part 81, a separating plate 11 is disposed between the connecting part 81 and the thermostat 9. The terminal box further comprises a wiring mechanism 12, one end of the wiring mechanism 12 is connected to the connecting part 81, and the other end thereof bypasses the outside of the separating plate 11 and is connected to a terminal 91 of the thermostat.

Figure 8:
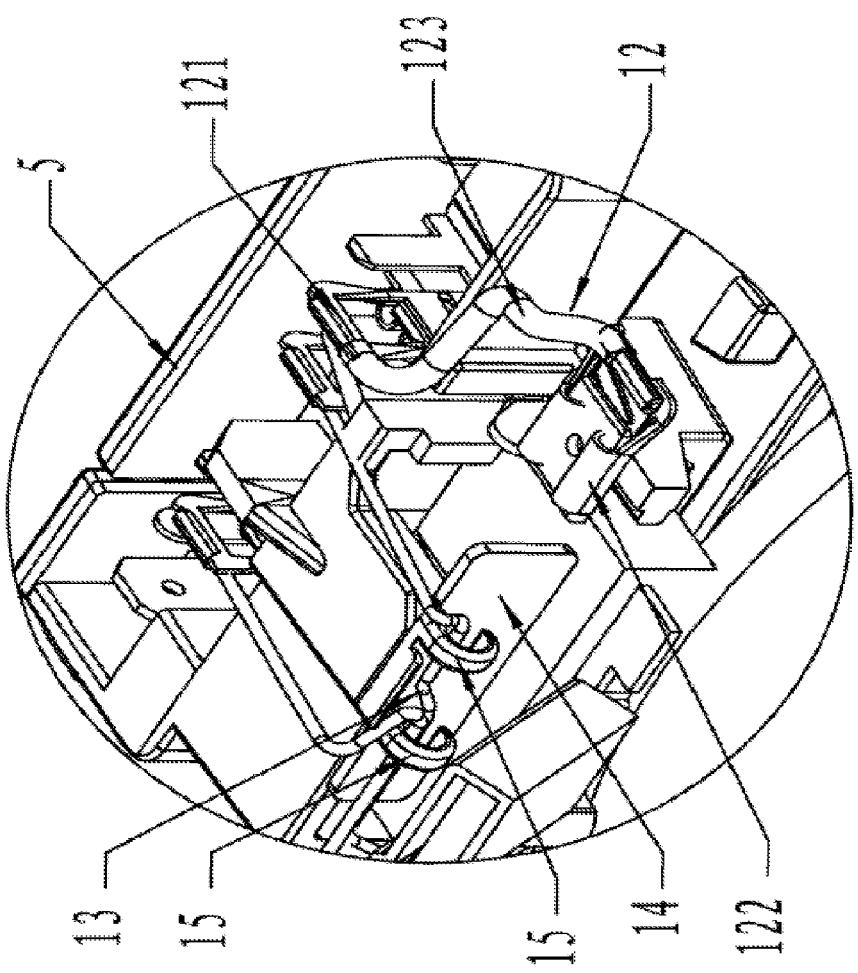
FIG. 8 is an enlarged view of FIG. 7 along an A-A line.

As shown in FIG. 8, a fixing part 14 is disposed on outer wall of the end cover and in the vicinity of the terminal box 5, the fixing part 14 comprises a fixing clamp 15, the fixing clamp 15 fixes an enameled wire 13 led out from the motor; and a tail of the enameled wire 13 is disposed in the terminal box 5 whereby forming electric connection.

As shown in FIGS. 2, 3 and 4, the wiring mechanism 12 comprises a first connecting terminal 121 connected to the connecting part 81, a second connecting terminal 122 connected to the terminal 91, and an electrical lead 123, one end of the electrical lead 123 is connected to the first connecting terminal 121, and the other end thereof bypasses the outside of the separating plate 11 and connected to the second connecting terminal 122. As shown in FIGS. 5 and 6, the connecting terminals each comprises a pressing part 124, and an inserting part 125 connected to the pressing part 124, the pressing part 124 presses and punctuates surface of the electrical lead 123, and the inserting part 125 is directly connected to the terminal 91 and the connecting part 81 whereby forming electric connection between the thermostat and the connecting part 81 of the electric contact 8.

Each of the connecting terminals is integrally formed via aluminum, the pressing part 124 and the inserting part 125 thereof are formed by bending two symmetric plates, and the pressing part 124 and the inserting part 125 are approximately B-shaped.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A terminal box for a centrifugal switch of a motor, the terminal box comprising:
   a box (51) comprising a receiving part (10);
   a movable control rod (7);
   multiple electric contacts (8);
   a thermostat (9) having a terminal (91); and
   a wiring mechanism (12);
wherein:

said movable control rod (7) is disposed on said box (51) and partially extends therefrom;

said electric contacts (8) are disposed in said box (51);

said thermostat (9) is disposed on end surface of said box (51);

said receiving part (10) operates to receive said thermostat (9);

one end of said electric contact (8) extends from said box (51) and forms a connecting part (81);

a separating plate (11) is disposed between said connecting part (81) and said thermostat (9);

one end of said wiring mechanism (12) is connected to said connecting part (81);

the other end thereof bypasses the outside of said separating plate (11) and is connected to said terminal (91); and said wiring mechanism (12) comprises a first connecting terminal (121), a second connecting terminal (122), and an electrical lead (123).

2. The terminal box of claim 1, wherein said first connecting terminal (121) is connected to said connecting part (81);

said second connecting terminal (122) is connected to said terminal (91);

one end of said electrical lead (123) is connected to said first connecting terminal (121); and the other end thereof bypasses the outside of said separating plate (11) and connected to said second connecting terminal (122).

3. The terminal box of claim 2, wherein each of said first connecting terminal (121) and said second connecting terminal (122) comprises a pressing part (124), and an inserting part (125) connected to said pressing part (124);

said pressing part (124) presses and punctuates surface of said electrical lead (123); and said inserting part (125) is directly connected to said terminal (91) and said connecting part (81).

4. A motor, comprising:

a stator (1);

a rotor (2);

a front end cover (3);

a rear end cover (4); and a terminal box (5), said terminal box (5) comprising:
  a box (51) comprising a receiving part (10);
  a movable control rod (7);
  multiple electric contacts (8);
  a thermostat (9) having a terminal (91); and
  a wiring mechanism (12);

wherein:

said front end cover (3) is connected to said rear end cover (4) whereby forming a cavity (6);

said rotor (2) and said stator (1) are disposed in said cavity (6);

said terminal box (5) is disposed on outer wall of one of said front end cover (3) and said rear end cover (4);

said movable control rod (7) is disposed on said box (51) and partially extends therefrom;

said electric contacts (8) are disposed in said box (51);

said thermostat (9) is disposed on end surface of said box (51);

said receiving part (10) operates to receive said thermostat (9);

one end of said electric contact (8) extends from said box (51) and forms a connecting part (81);

a separating plate (11) is disposed between said connecting part (81) and said thermostat (9);

one end of said wiring mechanism (12) is connected to said connecting part (81);

the other end thereof bypasses the outside of said separating plate (11) and is connected to said terminal (91);

a fixing part (14) is disposed on outer wall of said end cover and in the vicinity of said terminal box (5);

said fixing part (14) comprises a fixing clamp (15);

said fixing clamp (15) fixes an enameled wire (13) led out from said motor; and a tail of said enameled wire (13) is disposed in said terminal box (5).

5. The motor of claim 4, wherein said wiring mechanism (12) comprises a first connecting terminal (121), a second connecting terminal (122), and an electrical lead (123).

6. The motor of claim 5, wherein said first connecting terminal (121) is connected to said connecting part (81);

said second connecting terminal (122) is connected to said terminal (91);

one end of said electrical lead (123) is connected to said first connecting terminal (121); and the other end thereof bypasses the outside of said separating plate (11) and connected to said second connecting terminal (122).

7. The motor of claim 6, wherein each of said first connecting terminal (121) and said second connecting terminal (122) comprises a pressing part (124), and an inserting part (125) connected to said pressing part (124);

said pressing part (124) presses and punctuates surface of said electrical lead (123); and said inserting part (125) is directly connected to said terminal (91) and said connecting part (81).

8. The motor of claim 6, wherein each of said first connecting terminal (121) and said second connecting terminal (122) is integrally formed via aluminum.

\* \* \* \* \*